July 7, 1970      S. VERZOLLA      3,519,112

FLUID COUPLING WITH CENTRIFUGAL ROLLER LOCK-UP CLUTCH

Filed July 18, 1968      4 Sheets-Sheet 1

INVENTOR.
Sergio Verzolla,
BY Albert Josif
AGENTS

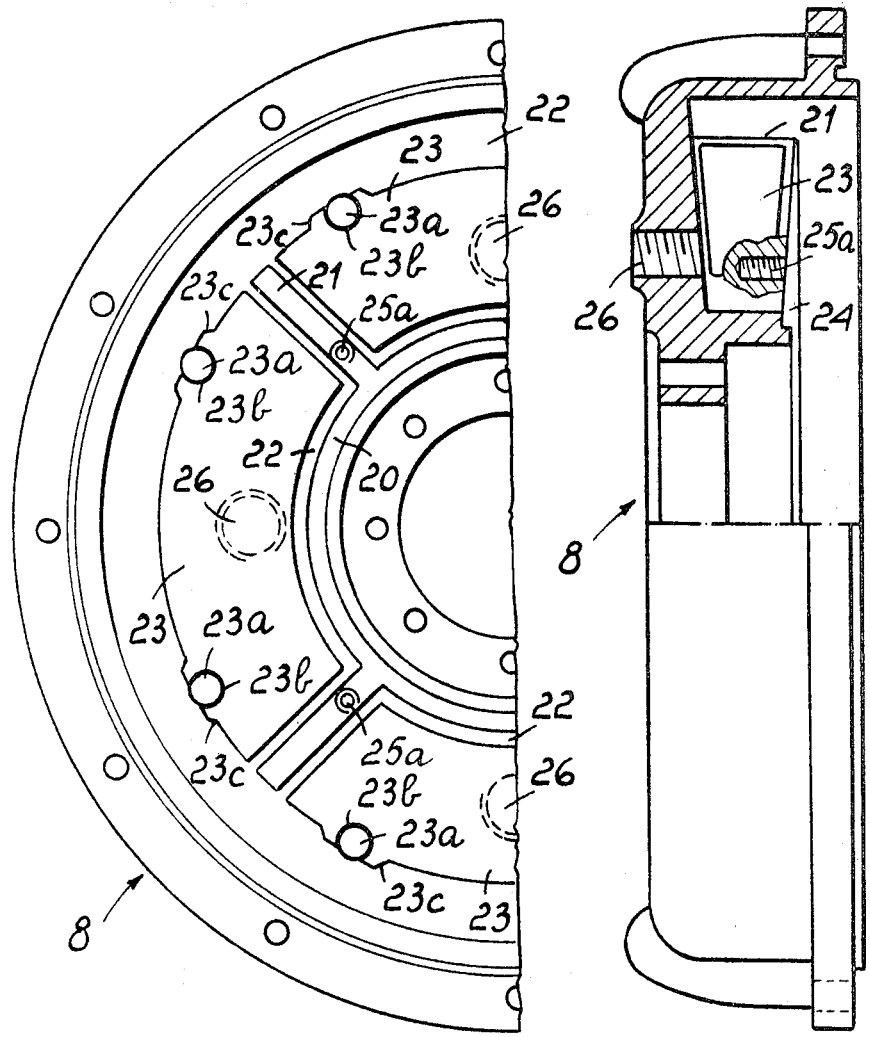

United States Patent Office 3,519,112
Patented July 7, 1970

3,519,112
FLUID COUPLING WITH CENTRIFUGAL ROLLER LOCK-UP CLUTCH
Sergio Verzolla, Via Amendola 11, Monza, Italy
Filed July 18, 1968, Ser. No. 745,905
Claims priority, application Italy, Mar. 13, 1968, 833,585; Apr. 18, 1968, 832,229
Int. Cl. F16d 47/06
U.S. Cl. 192—3.31
2 Claims

ABSTRACT OF THE DISCLOSURE

This disclosure relates to a coupling with a driving and a driven part including elements responsive to the action of centrifugal force carried by the driven part, the driving and the driven parts having means defining a hydraulic coupling thereby to gradually transmit rotation from said driving part to said driven part and to centrifugally actuate said elements when a determined rotation velocity of the driven part is attained, thereby to obtain a direct clutching between said driven and said driving parts through centrifugal expansion of said elements, characterized in that said elements responsive to the action of centrifugal force comprise a plurality of movable clutch block-like sectors located in respective seats in said driven part, and an annular solid portion on said driving part near said sectors thereby to allow engagement by centrifugal action between said sectors and said annular portion.

Background of the invention

This invention relates to a hydrodynamic gradual transmission coupling with subsequent clutching by centrifugal action.

The main object of the present invention is to conceive a coupling of the specified type in which there is a very smooth and gradual initial motion of the driven part with successive clutching in which the sliding between driving and driven parts is eliminated, without giving rise to sharp velocity changes and with the advantage of lesser wear with respect to known types and with practically no heating up.

Another object of the invention is that of providing a coupling which, within certain variation limits around the working velocity assures a practically direct coupling between a driving shaft and a driven shaft, specially suitable for use in coupling diesel engines.

Another object of the invention is that of providing a coupling of rational and simple structure, of easy manufacture and of long duration.

Summary of the invention

These and still further objects attained by the coupling according to the invention, with a driving and a driven part, including elements responsive to the action of centrifugal force carried by the driven part, the driving and the driven parts having means defining a hydraulic coupling thereby to gradually transmit rotation from said driving part to said driven part and to centrifugally actuate said elements when a determined rotation velocity of the driven part is attained thereby to obtain a direct clutching between said driven and said driving parts through centrifugal expansion of said elements characterized in that said elements responsive to the action of centrifugal force comprise a plurality of movable clutch block-like sectors located in respective seats in said driven part, and an annular solid portion on said driving part near said sectors thereby to allow engagement by centrifugal action between said sectors and said annular portion.

Brief description of the drawing

Further characteristics and advantages of the invention will readily appear from the detailed description of two preferred but not exclusive embodiments of a coupling according to the invention illustrated by way of not limiting examples in the accompanying drawing in which:

FIG. 2 shows in partial frontal view a part of the external cover of the coupling according to FIG. 1;

FIG. 3 shows, partly in axial section with cut out portions and partly in side view, the external cover according to FIG. 2;

Description of preferred embodiments

Figure 1:
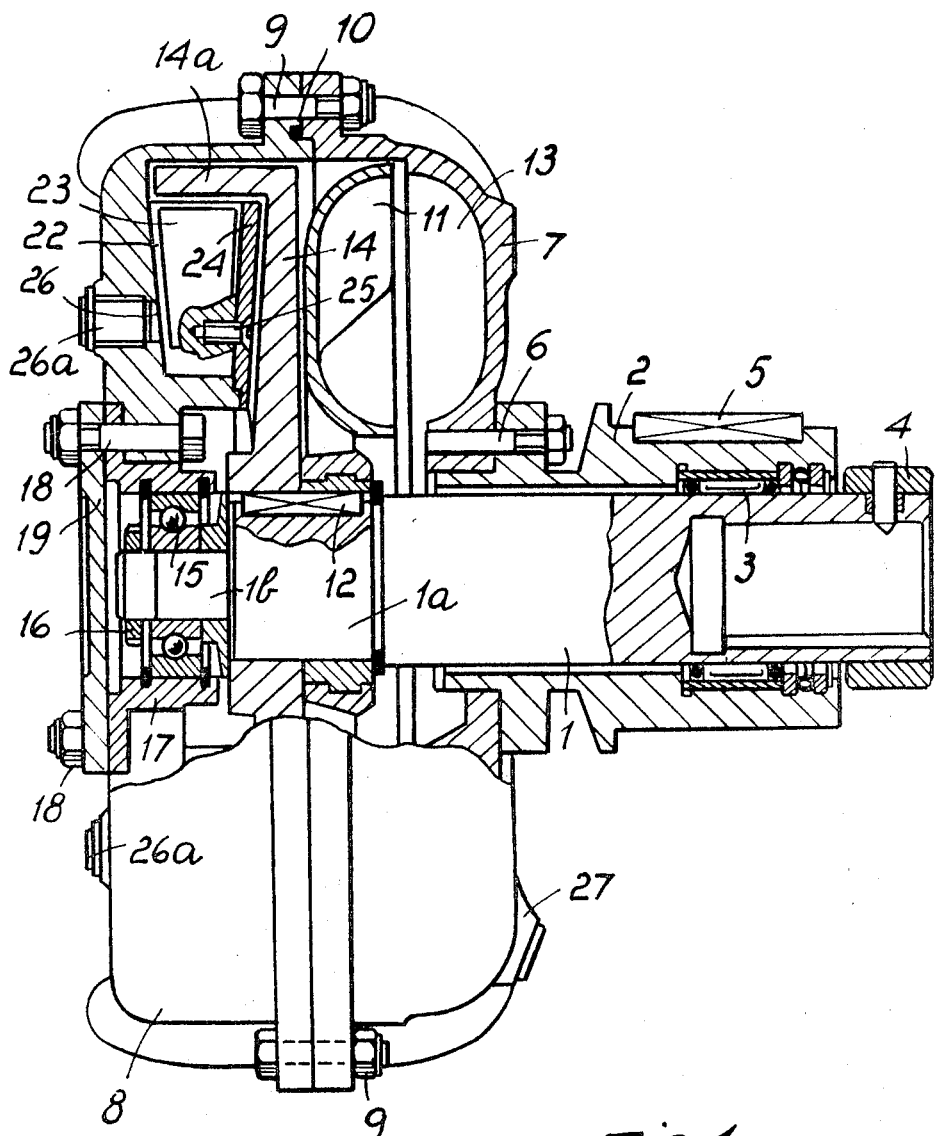
FIG. 1 shows in axial section with cut out portions a coupling in a first embodiment according to the invention.
Figures 4, 5:
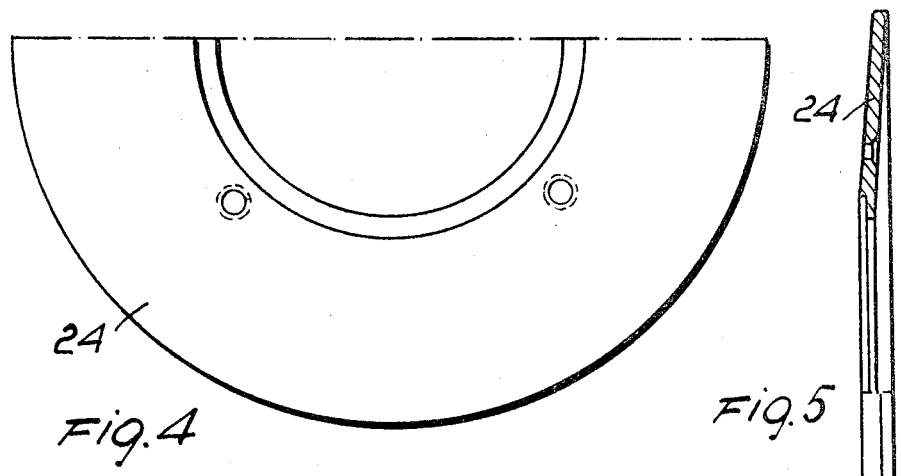
FIG. 4 is a partial frontal view of a cover element relative to the external cover part according to FIGS. 2 and 3.
FIG. 5 illustrates, partly in axial section and partly in side view, the cover element according to FIG. 4.

With reference to FIGS. 1 to 5, the coupling in a first embodiment of the invention includes a primary or driving shaft 1 to connect to prime movers and a secondary or driven shaft 2 of tubular construction, mounted to revolve coaxially around the said driving shaft, with a roller bearing 3 between them. A blocking ring 4 is fixed to the A friction disc 14 presenting peripherally an annular porvided for keying on a pulley, a gear, or the like (not shown). The secondary shaft 2 can be associated coaxially, as a variation, from the other side with respect to the driving shaft 1.

A half cover 7 is fixed to the driven shaft 2 by means of screws 6 which, together with another half cover 8, of corresponding shape, forms a box like body rotating together with the said driven shaft 2. The said half covers 7 and 8 are joined one to the other by means of peripheral screws 9 with the interposing of a sealing joint 10 (FIG. 1).

A hydraulic coupling arrangement is provided including an internal impeller 11 keyed by means of the key 12 to an internal portion 1a of the driving shaft 1 and an external turbine member 13 formed in the half cover 7 and facing the said impeller 11.

A friction disc 14 presenting peripherally an annular portion 14a of cylindrical coaxial shape with respect to the axis of the same disc and of the axis of the shaft 1 (FIG. 1) is also keyed by means of the key 12 to the portion 1a of the driving shaft 1. On the end portion 1b of the driving shaft 1, there is a ball bearing 15 held there by a metal ring 16 and arranged on the inside of a flange 17 which in turn is fixed to the half cover 8 in an axial position by means of screws 18 which also hold a closing plate 19. With this arrangement, the box like body composed of the half covers 7 and 8 can rotate on the driving shaft on the bearings 3 and 15.

The half cover 8, as shown in FIGS. 2 and 3, includes an internal projection 20 of annular cylindrical coaxial shape to which are fixed some radial fins 21 arranged at regular intervals (a total of 4 in the illustrated example) such as to define a member of internal chambers 22 in which clutch blocks 23 can be housed in the form of sectors in an oil bath, in mild steel for example or other material, movable by the action of centrifugal force. The fins 21 are prolonged radially to a point close to the internal surface of the cylindrical portion 14a of the disc 14, in the assembly arrangement.

The chambers 22 can be closed on the inside by an annular cover element 24 (FIGS. 4 and 5) that can be fixed by means of screws 25 applied to correspond to the respective holes 25a provided in the fins 21. With the element 24 fixed to the half cover 8, after the assembly of the coupling, the sectors 23 will be contained in the chambers 22.

As shown in FIG. 2, each sector 23 is provided with rotatable elements 23a, for example, rollers arranged with axes parallel to the axis of the coupling, assembled freely rotatable between respective seats 23b situated in the same sector. In the example illustrated, two rollers 23a are provided for each sector 23, placed to correspond with peripheral projections 23c on the sector.

The rollers 23a are, for example, of heat treated steel and the seats 23b are preferably case-hardened.

In this way the rollers 23a can rotate in the respective seats 23b without producing of material dust. In the half cover 8, holes 26 are provided in which plugs are fixed and through which holes the oil necessary for the functioning of the coupling can flow. Other openings 27 for the oil can be provided in the half cover 7 (FIG. 1). The operation of the coupling described above is as follows.

When the driving shaft 1 starts to rotate, the hydraulic coupling consisting of the impeller 11 and turbine member 13 comes into operation and there occurs a gradual drive of the driven shaft 2, with the operation being exactly similar to that of a conventional hydraulic coupling.

If the velocity of rotation of the driving shaft is slower than the working velocity, the sectors 23 do not experience the action of centrifugal force and rotate together with the half covers 7 and 8. When the velocity of rotation of the driving shaft 1 reaches the working velocity or nearly, the rotation induced by the half covers 7 and 8 compel the sectors 23 to move themselves towards the outside by means of the action of centrifugal force, such that the rollers 23a adhere to the internal surface of the cylindrical portion 14a of the friction disc 14.

For a determined working velocity the arrangement is such that the centrifugal force is sufficient to bring about the direct coupling by means of the sectors 23 and the relative rollers 23a in contact with the internal surface of the portion 14a (the rollers 23a are then blocked by friction in the respective seats 23b). There is thus coupling between the half cover 8 and the disc 14 more precisely between the driven shaft 2 and the driving shaft 1, the said sectors 23 occupying completely the spaces between one fin 21 and the other. There is in this way a velocity ratio of 1:1 between the driving shaft 1 and the driven shaft 2. If the resisting torque is very high relative to the motor torque, sliding can take place between the driving part and the driven part, this sliding giving rise to rotation of the rollers 23a around their respective axes.

This is a great advantage in that the sliding friction is transmitted between the rollers 23a and their respective seats 23b, made of material of suitable hardness, so that there is no relevant wear and no dust or material particles are produced that could form a type of sludge with the lubricant after a certain period of operation.

It should be noted that as the direct clutching section is mounted on the driven part of the coupling, the expansion pieces come into operation only when the velocity of rotation of the said driven part is close to that of the driving shaft 1, thus reducing also for this reason the friction between the various parts (the relative velocity between the driving parts and the driven parts is in fact small).

When the direct clutching has taken place, there is no sliding between the impeller 11 and turbine member 13. The heating up of the oil contained in these impellers as well as loss of power and of velocity are thus extremely reduced.

Figure 7:
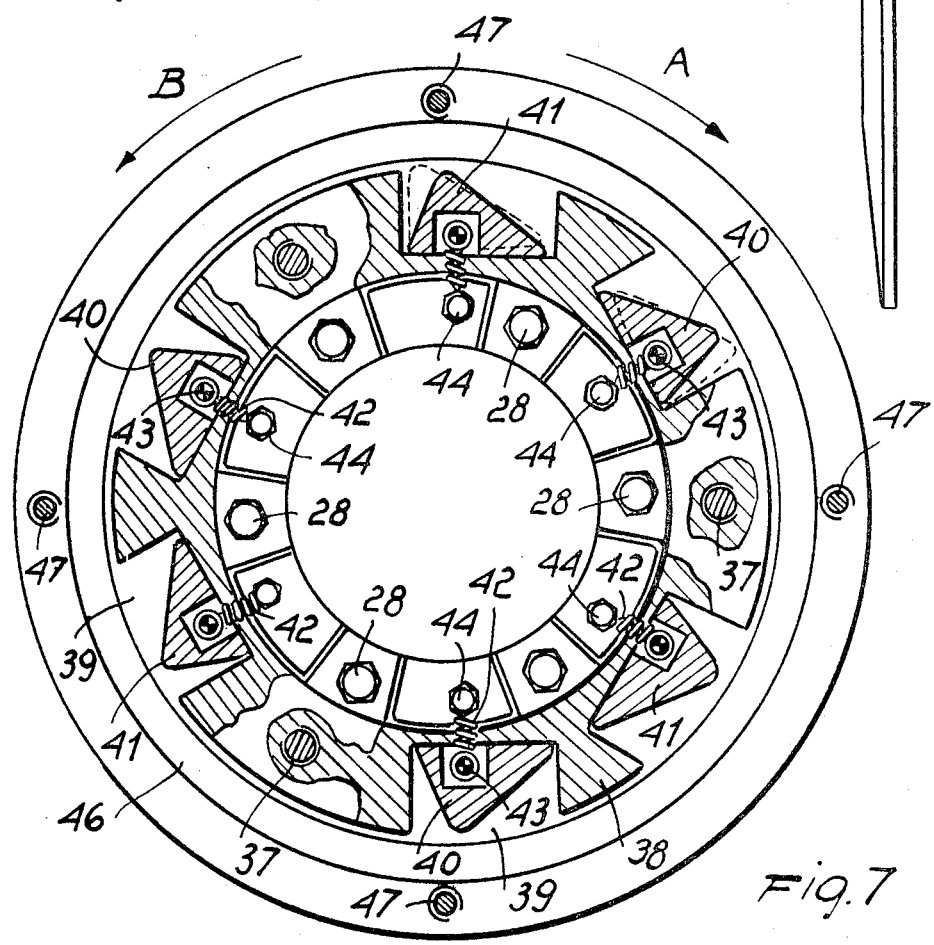
FIG. 7 is a transversal section of the coupling according to FIG. 6 with cut out portions drawn through the direct clutching device.
Figure 6:
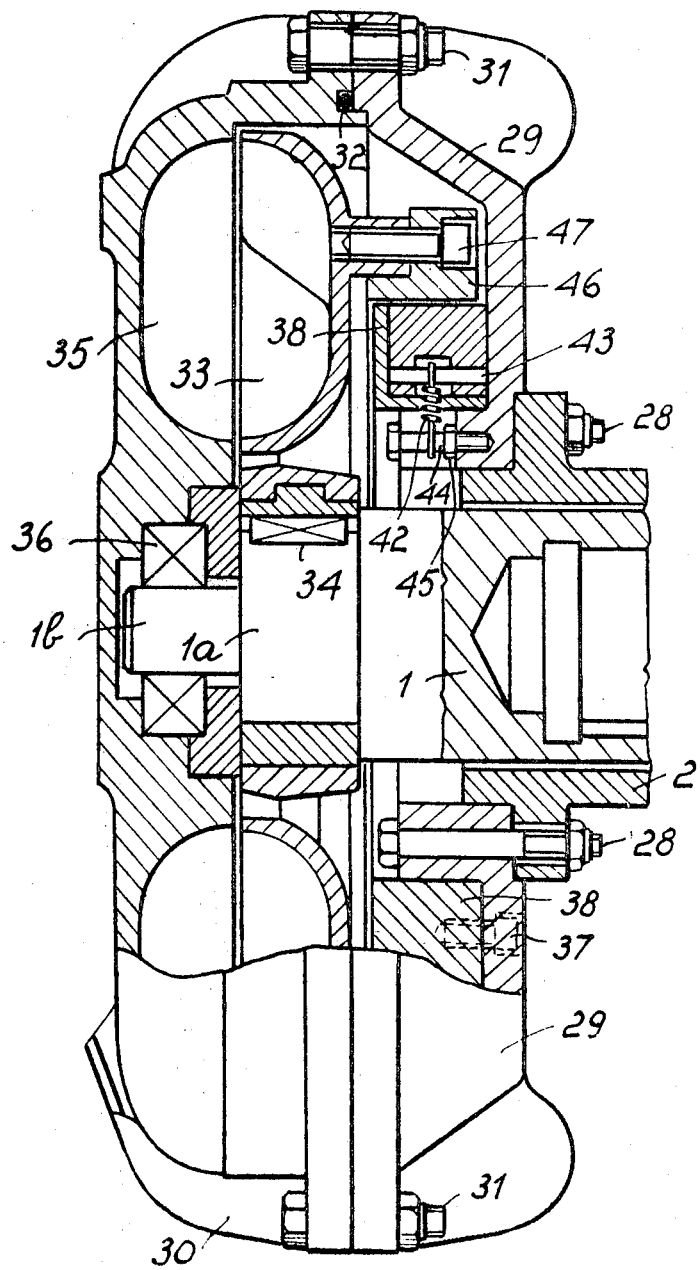
FIG. 6 illustrates in axial section, a second embodiment of the coupling according to the invention.

A second embodiment of the coupling according to the present invention is shown in FIGS. 6 and 7.

Referring to these latter figures, the coupling includes similarly to the embodiment described above, a primary or driving shaft 1 to connect to prime movers and a secondary or driven shaft 2 of tubular construction, mounted to revolve coaxially around the said primary shaft. A pulley, a gear wheel or suchlike (not shown) is keyed onto the driven shaft 2. As a variation, the secondary shaft 2 can be fixed coaxially from the other side with respect to the driving shaft 1.

The half cover 29 is fixed to the secondary shaft 2 by means of screws 28, and, together with another half cover 30 of corresponding shape from a box like body rotating together with the said driven shaft 2. The said half covers 29 and 30 are joined one to the other by means of peripheral screws 31 with the interposing of a sealing joint 32 (FIG. 6).

The hydrodynamic section of the coupling includes an internal impeller 33 keyed by means of a key 34 onto an internal 1a of the driving shaft 1 and a turbine member 35 formed in the half cover 30 and facing the said internal impeller 33.

On the terminal portion 1b of the primary shaft 1 there is a ball bearing 36 such that the box like body formed from the half covers 29 and 30 can rotate around the driving shaft 1.

A disc 38 is also fixed to the half cover 29, mounted coaxially on the inside of screws 37. This disc is provided on the periphery with a plurality of hollowed out seats 39 for receiving respective clutch blocks 40, 41 having a substantially wedge shaped form. The base of these clutch blocks, in the rest position, adheres to the most internal portion of the respective seat 39, as return springs 42 are provided. More precisely each of the said clutch blocks 40, 41 is provided with a transversal pin 43 to which one end of the respective spring 42 is fixed, the other end being fixed to a bolt 44 which, in its turn, is fixed to the half cover 29 by screwing and locking with the respective nut 45.

As shown in FIG. 7, each of the said clutch blocks 40, 41 is shaped substantially in the form of a scalene triangle; the said clutch blocks are arranged alternately with their positions reversed, i.e. the clutch blocks 40 in the same position and the brake blocks 41 in the inverse position. All the said clutch blocks can oscillate over a short distance around the pins 43 and present their most external portion conveniently rounded and slightly receding in the rest position, with respect to the external profile and the disc 38.

The above mentioned clutch blocks 40 and 41 form the parts sensitive to the action of centrifugal force and are urged by this latter to move themselves towards the outside so adhering to the internal surface of an annular body 46 in the form of a coaxial cylinder with respect to the axis of the coupling.

The body 46 is fixed by means of screws 47 to the impeller 33. The operation of the coupling relative to the second embodiment is as follows.

When the velocity of rotation of the driving shaft 1 reaches the working velocity nearly, the rotation induced in the half covers 29 and 30 compels the clutch blocks 40, 41 to move towards the outside by the action of centrifugal force such as to enter into contact with the internal surface of the annular body 46.

There is thus direct coupling, by way of the clutch blocks 40 and 41, between the internal impeller 33 and the disc 38, or more precisely between the driven shaft 2 and the driving shaft 1.

In the case when the rotation of the disc 38 is in the direction of the arrow A of FIG. 7, there is in addition a clamping engagement of the clutch blocks 40 which move themselves as indicated by the dotted lines in the said figure, rotating for a short distance around the respective pins 43. The clamping engagement takes place because of the particular form of the above mentioned clutch blocks and for the drag action exercised at the external portions by friction on the internal surface of the annular body 46. After the said clamping engagement the annular body 46, remains directly locked to the disc 38 (by way of the clutch blocks 40) in such a way that the clutching maintains itself even if the action of the centrifugal force diminishes considerably. In other words, the direct clutching is maintained even if the rotation of the driven shaft 2 slows down sharply, for example because of a considerable increase in the resisting force. In practice the above mentioned direct clutching maintains itself until the driven shaft 2 stops.

This in some cases is very advantageous, in that it allows the possibility of exceeding the slowing down rate as the driven shaft is always connected to the driving shaft and in consequence to the prime movers.

Should the rotation of the disc 38 take place in the inverse sense, more precisely in the direction of the arrow B of FIG. 7, the clutch blocks 41 enter into operation moving themselves slightly as indicated by the dotted line, rotating for a short distance around the respective pins 43, in exactly the same way as described above with reference to the clutch blocks 40.

In this way the clutch blocks 41 also operate on clamping engagement such as to lock the disc 38 and the annular body 46 together maintaining the said clamping engagement also in the case of slowing down produced for example by an increase in the resisting moment.

When the driven shaft 2 stops, the clutch blocks 40, 41, are no longer urged in the tangential sense by friction with the internal surface of the annular body 46 and therefore they return to the rest position (drawn in full line in FIG. 7) by the action of the return springs 42.

It should be noted that the coupling in either of the embodiments according to the present invention, ensures a completely satisfactory engagement between the driven shaft and the driving shaft, when a smooth and gradual start up is required followed by direct clutching that eliminates any sliding, reducing wear to a minimum.

It will be understood that the rollers 23a can be substituted by balls and the clutch blocks 40, 41 can be of different shape with respect to that represented.

I claim:

1. A coupling with a driving and a driven part including elements responsive to the action of centrifugal force, the driving and the driven parts having means defining a hydraulic coupling thereby to gradually transmit rotation from said driving part to said driven part and means for obtaining a clutching engagement between them through centrifugal actuation of said elements when a deteormined rotation speed of the driven part is attained, said means for the clutching engagement comprising an annular member rigid with said driving part and coaxial with the axis of rotation thereof and a plurality of block-like sectors surrounded by said annular member and in rigid rotatory relation with the driven part and radially movable against said annular member, wherein according to the improvement, the coupling further comprises rolling members, and said block-like sectors have on their surface facing said annular member seats for said rolling members, at least a portion of the rolling surface of said rolling members projecting from said surface facing said annular member to provide the clutching engagement therewith when the centrifugal action urges said block-like sectors against said annular member.

2. A coupling according to claim 1, wherein said rolling members are cylindrical rolls and said seats for said rolling members have a corresponding partial cylindrical shape the axis of which is parallel to the axis of rotation of said driven and driving parts.

References Cited

UNITED STATES PATENTS

| | | | |
|---|---|---|---|
| 2,034,757 | 3/1936 | Herreshoff | 192—3.31 |
| 2,616,537 | 11/1952 | Grattan | 192—3.31 |
| 2,633,952 | 4/1953 | Zeidler | 192—3.31 X |
| 2,644,535 | 7/1953 | Koup et al. | 192—3.31 X |
| 2,888,842 | 6/1959 | Ahlen | 192—3.31 X |
| 3,156,335 | 11/1964 | Nelden | 192—3.31 X |

BENJAMIN W. WYCHE III, Primary Examiner

U.S. Cl. X.R.

192—30, 103